Aug. 11, 1959
W. C. PIERCE
2,899,037
ELECTROMAGNETIC TORQUE DEVICE
Filed June 20, 1958
2 Sheets-Sheet 1
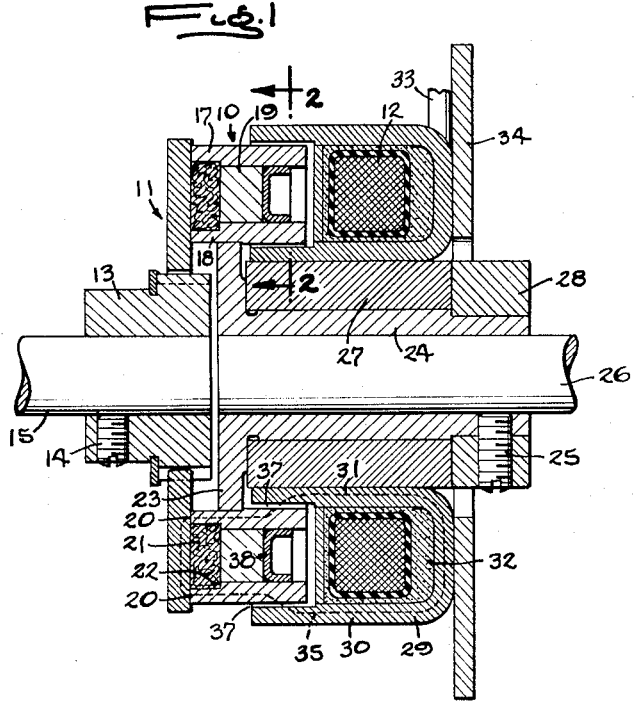
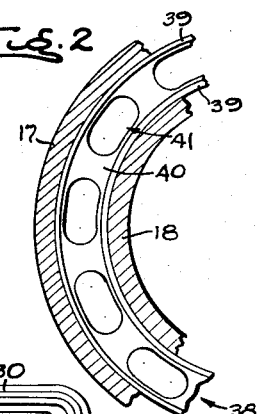
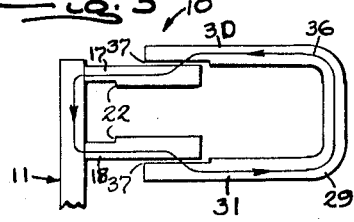
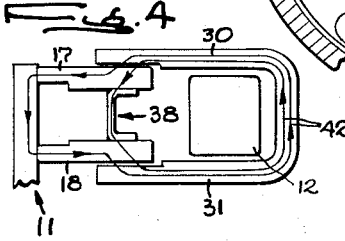
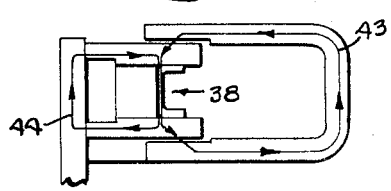
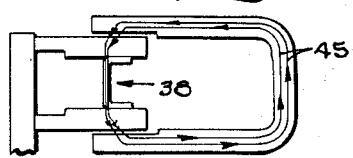
INVENTOR
William C. Pierce
By Carlsen, Pitzner, Hubbard Wolfe
ATTORNEYS Aug. 11, 1959 W. C. PIERCE 2,899,037
ELECTROMAGNETIC TORQUE DEVICE
Filed June 20, 1958 2 Sheets-Sheet 2
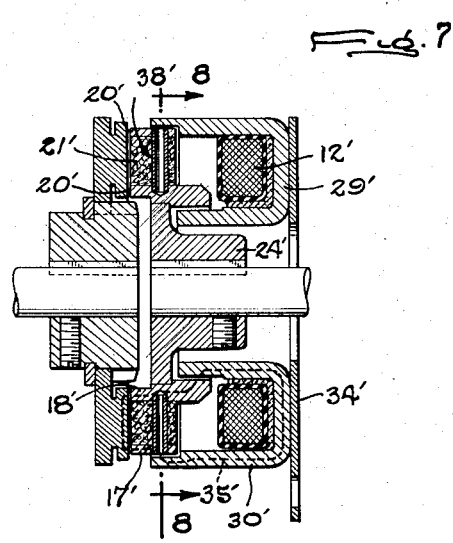
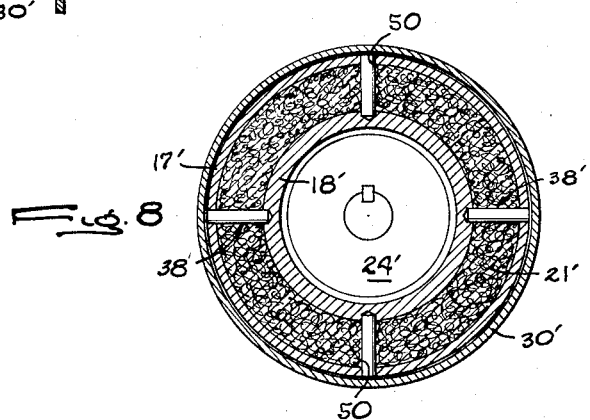
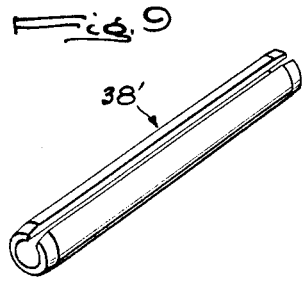
INVENTOR
William C. Pierce
by Carlson, Pitzner, Hubbard & Wolfe
ATTORNEY United States Patent Office 2,899,037
Patented Aug. 11, 1959

2,899,037

ELECTROMAGNETIC TORQUE DEVICE

William C. Pierce, Beloit, Wis., assignor to Warner Electric Brake & Clutch Company, South Beloit, Ill., a corporation of Illinois Application June 20, 1958, Serial No. 743,253

5 Claims. (Cl. 192—84)

This invention relates to an electromagnetic torque producing device having relatively portable core and armature members and a coil which operates when energized to produce a magnetic flux for attracting the members together, such flux threading a toroidal path defined by the members and extending through opposed working faces thereon. It is common in devices of this character to include in the toroidal flux path a nonmagnetic gap for reducing the residual flux remaining in the coil and armature members and tending to couple the same together when the coil is deenergized. Although the gap is effective to reduce the residual flux to a small fraction of the total flux produced by energization of the coil, this residual flux nevertheless is highly objectionable in some applications of such devices.

The primary object of the invention is to effect a more complete dissipation of the residual flux at the working faces of a device of the above character than has been possible heretofore.

A further object is to reduce the residual flux at the pole faces substantially to zero while avoiding substantial reduction of the working flux at the pole faces and therefore the torque produced for a given degree of energization of the coil.

A more detailed object is to obtain the desired reduction of residual flux by a permanent magnet arranged on the core in a novel manner to perform the additional function of holding parts of the core assembled in the proper relation.

Other objects and advantages of the invention will become apparent from the following detailed description taken in connection with the accompanying drawings, in which—

Figure 1 is a diametrical cross sectional view of one form of friction clutch embodying the novel features of the present invention.

Fig. 2 is a fragmentary sectional view taken along the line 2—2 of Fig. 1.

Figs. 3, 4, 5 and 6 are diagrammatic views showing the distribution of flux in the magnetic clutch parts under different conditions.

Fig. 7 is a view similar to Fig. 1 of a modified construction.

Fig. 8 is a fragmentary sectional view taken along the line 8—8 of Fig. 7.

Fig. 9 is a perspective view of one of the connecting pins shown in Figs. 7 and 8.

Referring to Figs. 1 to 6 of the drawings, the invention is shown for purposes of illustration incorporated in an electromagnetic friction clutch having driving and driven elements 10 and 11 rotatable about a common axis. The elements are drawn into frictional gripping engagement with each other by magnetic flux threading back and forth through the elements and controlled by energization and deenergization of a stationarily mounted winding 12. One element 11 is the magnet armature which comprises a flat ring of magnetic material internally toothed and splined onto a collar 13 secured as by a set screw 14 to a driven shaft 15.

The other clutch element 10 is a rotary part of the magnet formed of two concentric cylindrical rings 17 and 18 rigidly secured together by a nonmagetic connection 19. These rings constitute pole pieces which terminate at end faces 20 flush with each other and adapted for axial engagement with the face of the armature 10. Segments 21 of nonmagnetic wear resisting material are disposed between the pole pieces 17 and 18 and are backed by shoulders 22 thereon, the outer surfaces of the segments being flush with the pole faces 20. In the present instance, the rigid connection 19 is a radially disposed ring of copper or other nonmagnetic material suitably secured as by brazing to the rings 17 and 18. The inner pole piece 18 is brazed onto the periphery of an outturned flange 23 on one end of a nonmagnetic sleeve 24 fastened as by a set screw 25 to a driving shaft 26 alined with the driven shaft 15. Intermediate its ends, the sleeve is journaled in a bearing sleeve 27 of nonmagnetic material which is held in place against the flange 23 by a collar 28 secured to the other end of the sleeve by the set screw 25.

The nonrotatable part 29 of the magnet core is pressed onto the exterior of the bearing sleeve 27 and comprises a ring of magnetic material of U-shaped cross section enclosing the winding 12 and having concentric cylindrical pole rings 30 and 31 projecting axially beyond the winding and telescoping closely with the rotary pole pieces 17 and 18, the latter in this instance being disposed between the pole rings. The winding comprises a multiplicity of turns held in the bottom of the U by suitable binding material 32 with the end portions 33 of the wire extending outwardly through a hole in the outer pole ring 30. To hold the core ring 29 against rotation, a suitable nonrotatable stop (not shown) may be positioned for engagement with a radial arm 34 welded to the closed end of the U.

Upon energization of the coil 12 from a direct current source (not shown), magnetic flux produced thereby threads a torodial path 35 defined by the armature 11 and the magnet core and extending around the closed ends of the core ring 29, radially through the air gap 37 between each of the pole rings 30 and 31 and the adjacent telescoping one of the pole pieces 17 and 18, axially through the latter and the pole faces 20, and radially through the armature as indicated by the dotted line in Fig. 1. When the coil is deenergized, the residual flux of the magnetic parts continues to thread the toroidal path in the same direction as the coil flux. In Fig. 3 in which it is assumed that the only circuit for the residual flux and the coil flux is the toroidal path 35, these fluxes are represented by an arrowed line 36 as threading the path in a counterclockwise direction.

To reduce the amount of residual flux in the magnetic parts defining the flux path 35, it is the practice in friction devices of this character to interpose one or more nonmagnetic gaps of fixed length in the flux circuit. In the present instance where the magnet comprises telescoping fixed and rotatable parts, the running radial air gaps 37 between the pole pieces and the pole rings conveniently may be utilized as these nonmagnetic gaps for reducing the residual flux. Although the air gaps 37 are effective to reduce the residual flux to a small fraction, for example, one-twentieth, of the flux resulting from energization of the coil 12, the amount of residual flux remaining in the pole faces 20 is sufficient to produce a frictional drag on the armature 11 which is highly undesirable in some installations where this type of device may be used.

In accordance with the present invention, novel means is provided to dissipate the residual flux in the pole faces 20 completely and thereby eliminate the objectionable drag on the armature 11 without reducing materially the working flux in the pole faces when the coil 12 is energized. This means comprises a magnetic shunt 38 bridging portions of the toroidal flux path 35 spaced from the pole faces so that the shunt parallels the armature. The residual magnetism of the shunt is correlated with that of the parts defining the flux path to supply, when the coil is deenergized, a flux of a sufficient amount and proper direction to divert the residual flux of the U-shaped core ring 29 away from the pole faces and to oppose and substantially cancel the flux in the pole faces due to the residual magnetism in the armature. The amount of residual flux required in the shunt to accomplish this result is equal approximately to the total residual flux of the magnetic core and armature parts defining the flux path.

To supply the desired amount of residual flux and still be of small length compared to the magnetic core and armature parts defining the flux path 35, the shunt 38 bridges the pole pieces 17 and 18 between the pole faces 20 and the air gaps 37 and is formed of a permanent magnet material such as carbon steel having a substantially higher coercive force than the soft iron used for the core and armature parts. The amount of working flux diverted away from the pole faces and through the shunt is kept at a negligibly small value by making the cross sectional area of the flux path through the shunt of a low value for saturation of the shunt by a small fraction of the flux produced by energization of the coil 12. The remainder of the coil flux then is available as active or working flux for attracting the armature against the pole faces.

The shunt 38 may take various forms. For example, as shown in Figs. 1 to 6, it may be a ring of U-shaped radial cross-section disposed between the pole pieces and against the rigid connection 19 and having concentric inner and outer cylindrical legs 39 telescoping closely and having tight press fits with the inner periphery of the outer pole piece 17 and the outer periphery of the inner pole piece 18 respectively. The cross sectional area of the flux path through the shunt is reduced by perforating the closed end 40 thereof between the legs 39 at angularly spaced points as indicated at 41 (Fig. 2). In one clutch constructed as described above and having dimensions equal to one-half of those shown in Figs. 1 and 2, the shunt was stamped from a sheet of SAE 1045 carbon steel .0120 of an inch thick quenched from 1500 degrees Fahrenheit and hardened to Rockwell C-50.

In the operation of the improved clutch with the shunt 38 paralleling the armature 11, magnetic flux produced in the U-shaped core ring 29 by energization of the coil 12 divides between the shunt and the armature as indicated by arrowed lines 42 in Fig. 4 in inverse proportion to the reluctances of the flux paths through these two parts. Due to its small cross sectional area, the shunt becomes saturated by a small fraction of the total coil flux and its reluctance increases correspondingly. The remaining major portion of the coil flux then threads the pole faces 20 and the armature to attract the latter into gripping engagement with the pole faces and the intervening wear segments 21 and couple the driving and driven shafts 15 and 26 together.

When the coil 12 is deenergized, the residual flux in the shunt 38 tends to thread the magnetic core and armature parts as indicated by arrowed lines 43 and 44 in Fig. 5 in which it is assumed that the only flux in these parts is that of the shunt. In the loop extending from the shunt across the air gaps 37 and around the core ring 29, the direction of the shunt flux indicated by the line 43 is counterclockwise the same as that of the residual flux in the core ring, indicated by the line 36 in Fig. 3. In the other loop extending between the ends of the shunt through the pole faces 20 and the armature 11, the direction of the shunt flux as indicated by the line 44 in Fig. 5 is clockwise and therefore opposite to that of the residual armature and pole piece flux indicated by the line 36 in Fig. 3. Being equal approximately to the total residual flux in the core and armature parts, the residual flux of the shunt 38 effectively diverts the residual flux of the core ring away from the pole faces 20 and reduces the residual flux of the latter to zero. Thus, when the coil 12 is deenergized, the only flux threading the core and armature parts is the residual flux in the loop extending through the shunt and around the core ring as indicated by arrowed lines 45 in Fig. 6.

In one clutch constructed as described above without a shunt between the rotary pole pieces, the residual flux in the pole faces 20 was found by measurement to be approximately 4.2 percent or one-twenty-fourth of the flux in the faces when the coil 12 was energized at its rated current. After the pole pieces were bridged by a permanent magnet shunt 38 having the proper dimensions to supply a residual flux equal approximately to the residual flux of the core and armature parts and adapted to become saturated at a small fraction of the total coil flux, the coil was energized again at the rated current and the flux at the pole faces was found by measurement to be 99.1 percent of the flux when the coil was energized without a shunt between the pole faces. After deenergization of the coil with the shunt present, the residual flux was found to be too small to measure with the instruments used. Thus, the shunt was effective in reducing the residual flux at the pole faces from 4.2 percent of the total coil flux to a negligibly small amount thereby substantially eliminating frictional drag on the armature while reducing the working flux at the pole faces by less than one percent.

In addition to dissipating substantially all of the residual flux at the pole faces when the coil is deenergized, the magnetic shunt between the pole pieces also may function as the rigid connection between the pole pieces. Such a construction is illustrated in Figs. 7 and 8 where parts corresponding to parts in Figs. 1 to 6 bear the same but primed reference characters.

Referring to Figs. 7 and 8, the combined shunt and rigid connection 38' comprises a plurality of pins which are angularly spaced around and extend radially between the pole pieces 17' and 18'. At opposite ends, each pin is secured to the respective pole pieces. To obtain the desired dissipation of residual flux at the pole faces 20', the cross sectional areas and lengths of the pins are correlated to provide for all of the pins a total residual flux which is equal approximately to the total residual flux in the core and armature parts defining the toroidal flux path 35', that is, the same residual flux which is provided by the channel member of Figs. 1 to 6.

There are four pins 38' in the present instance and these are formed as tubes of resilient material split along their lengths and radially expansible and contractible. After a hardened friction material 21' has been inserted between and cemented to the pole pieces 17' and 18', the latter and the friction material are drilled intermediate the ends of the pieces to form radial holes 50 for receiving the pins. The diameters of the holes are slightly smaller than the unstressed outer diameters of the pins so that after they are contracted radially and driven into the holes, the pins expand radially into frictional gripping engagement with the walls of the holes. A material possessing the desired resilience and magnetic retentive properties is high carbon steel.

The operation of the modified clutch is similar to that of Figs. 1 to 6 with flux produced by energization of the coil 12' dividing between the armature 11' and the shunt through the pins 38'. Due to the small cross sectional area of the pins, the latter are saturated by a small amount of flux and the coil flux constitutes working flux which attracts the armature against the pole faces 20'. Upon deenergization of the coil, the residual flux in the stationary U-shaped core member 29' is diverted away from the pole faces and the armature and through the pins because of the residual magnetism of the pins. This residual magnetism also opposes the residual magnetism in the armature and the end portions of the pole pieces between the pins and the armature so that the flux attracting the armature toward the pole faces is reduced substantially to zero.

This application is a continuation-in-part of my application, Serial No. 552,202, filed December 9, 1955, now abandoned.

I claim as my invention:

1. In an electromagnetic friction device, the combination of, a core of magnetic material of generally U-shaped radial cross section having radially spaced annular pole pieces terminating in axially facing pole faces, an armature ring of magnetic material spanning and adapted for axial gripping engagement with said pole faces and cooperating with said core to define a toroidal flux path extending around the closed end of the core and axially back and forth between the core and the armature through the pole faces, means mounting said armature and said pole pieces for rotation relative to each other, a magnetic connection including permanent magnet material and spanning said pole pieces at points spaced from said pole faces so that the connection is in parallel with said armature, a coil seated within said core between said closed end and said connection and operable when energized to produce a flux which divides between the connection and said armature, and means providing a nonmagnetic gap in the portion of said flux path extending from said shunt around said closed end of said core, said gap reducing the residual flux in said core to a small fraction of said coil flux, said connection having a saturation flux value equal to a small fraction of said coil flux and a residual flux substantially equal to said residual flux of said core and armature so as to reduce the flux in said pole faces substantially to zero when said coil is deenergized.

2. In an electromagnetic friction device, the combination of, a core of magnetic material having two annular radially spaced pole pieces terminating in concentric axially facing pole faces, an armature spanning and adapted for axial gripping engagement with said pole faces, means mounting said pole pieces and said armature for rotation relative to each other, said core and armature cooperating to define a toroidal flux path extending axially back and forth through said faces, a coil carried by said core within said path, a shunt of permanent magnet material bridging said pole pieces at points spaced from said armature and located between the latter and said coil, said coil operating when energized to produce a flux which divides between said armature and said shunt and the latter having a saturation flux value equal to a small fraction of the coil flux whereby the major portion of the coil flux threads said armature and said pole faces, means providing a nonmagnetic gap in the portion of said path extending from said shunt around said coil, said gap reducing the residual flux in said core to a small fraction of said coil flux, said shunt having a residual flux correlated with said residual flux in said core and armature to reduce the flux in said pole faces and therefore the attractive force between the latter and the armature substantially to zero when said coil is deenergized.

3. In an electromagnetic torque producing device, the combination of, an annular core of magnetic material having spaced pole pieces providing spaced annular pole faces, an armature of magnetic material bridging said pole faces and attracted thereto by magnetic flux threading a toroidal path defined by the armature and the core and extending back and forth through the armature and the pole faces, a shunt around said armature including permanent magnet material and bridging said pole pieces at points spaced from said pole faces, a coil operable when energized to produce a magnetic flux dividing between said armature and said shunt and magnetizing the armature and the shunt in the same direction between the pole pieces, said shunt having a saturation flux value equal to a small fraction of said coil flux whereby the major portion of the latter threads said pole faces and said armature to attract the armature toward the pole faces, and means providing a nonmagnetic gap in the portion of said flux path extending around the core from said shunt and away from said pole faces and said armature, said gap reducing the residual flux in said core to a small fraction of said coil flux, said shunt having a residual flux approximately equalling said residual flux in said core and armature and acting to oppose the residual flux in the armature and divert the residual flux in the core away from said pole faces so as to reduce the flux between the pole faces and the armature substantially to zero when said coil is deenergized.

4. The combination of claim 3 in which said shunt comprises a plurality of pins of permanent magnet material extending radially between and angularly spaced around said pole pieces and each secured at opposite ends to the pole pieces to connect the latter rigidly together, said pins having cross sectional areas and lengths correlated to provide said shunt residual flux approximately equalling said residual flux in said core and armature.

5. In an electromagnetic clutch, the combination of, a pair of annular rotary pole pieces radially spaced apart in concentric relation and terminating at corresponding ends in axially facing pole faces, means supporting said pole pieces for rotation about their common axis, a magnetic armature ring spanning and opposing said faces and mounted for rotation relative thereto, a nonrotatable core ring of magnetic material providing radially spaced cylindrical surfaces concentric with said pole pieces and telescoping respectively with the other ends thereof to define a nonmagnetic gap between each pole ring and the associated pole piece, a multiple turn winding seated within said core ring and operable when energized to produce a flux threading a toroidal path extending around the core ring, radially across one of said gaps, axially through one of said pole pieces and its pole face, radially through said armature, axially back through the other pole face and pole piece, radially across the other gap, and back to the core ring, said gaps acting to reduce the residual flux in said path to a small fraction of said coil flux when said coil is deenergized, and a plurality of pins of permanent magnet material extending radially between and angularly spaced around said pole pieces and secured at opposite ends to the pole pieces to connect the latter rigidly together, said pins having cross sectional areas and lengths correlated to provide a residual flux equal approximately to said residual flux in said path to divert the residual flux of said core ring away from the pole faces and reduce substantially to zero the flux in the pole faces caused by residual magnetism in the armature.

References Cited in the file of this patent

UNITED STATES PATENTS

| | | |
|---|---|---|
| 2,411,055 | Rich | Nov. 12, 1946 |
| 2,729,318 | Harter | Jan. 3, 1956 |
| 2,738,449 | Mason | Mar. 13, 1956 |
| 2,739,684 | Meyer | Mar. 27, 1956 |
| 2,765,878 | Pierce | Oct. 9, 1956 |
| 2,778,466 | Perry | Jan. 22, 1957 |

FOREIGN PATENTS

| | | |
|---|---|---|
| 814,547 | Germany | Sept. 24, 1951 |